United States Patent [19]

Campbell, Jr. et al.

[11] 4,041,132
[45] Aug. 9, 1977

[54] FLUID BED DEHYDRATION OF BORAX

[75] Inventors: George W. Campbell, Jr., Hesperia; David G. Wilkins; Jerome T. Muench, both of Lancaster, all of Calif.

[73] Assignee: United States Borax & Chemical Corporation, Los Angeles, Calif.

[21] Appl. No.: 659,915

[22] Filed: Feb. 20, 1976

Related U.S. Application Data

[63] Continuation of Ser. No. 504,350, Sept. 9, 1974, abandoned.

[51] Int. Cl.² .............................................. C01B 35/12
[52] U.S. Cl. .................................... 423/279; 23/302 T
[58] Field of Search ........................... 423/279; 23/302

[56] References Cited

U.S. PATENT DOCUMENTS

| 2,032,388 | 3/1936 | Allen | 423/279 |
| 2,097,411 | 3/1967 | Corkill | 423/279 |
| 2,131,793 | 10/1938 | Cramer et al. | 423/279 |
| 3,309,170 | 3/1967 | Griswold | 423/279 |

FOREIGN PATENT DOCUMENTS

| 645,547 | 5/1937 | Germany | 423/279 |
| 219,582 | 8/1968 | U.S.S.R. | 423/279 |

*Primary Examiner*—G. O. Peters
*Attorney, Agent, or Firm*—James R. Thornton

[57] ABSTRACT

Borax 10 mol or a mixture of ground borate ore, and borax 10 mol, can be effectively dehydrated to produce a product having approximately 62% $B_2O_3$ and up to about three to four percent insolubles in a three-stage fluid bed dehydration process followed by compaction of the dehydrated borax.

8 Claims, No Drawings

FLUID BED DEHYDRATION OF BORAX

This is a continuation of application Ser. No. 504,350, filed Sept. 9, 1974, now abandoned.

BACKGROUND OF THE INVENTION

This invention relates to a process of dehydrating borax.

Anhydrous borax and borax with 5 mols water of hydration have long been produced in both a pure and an impure form having insolubles present. However, with the critical need to reduce energy consumption it was necessary to develop a method of dehydrating borax that would not require a large expenditure of energy and that could be conducted using a variety of fuels, the fuel used in the process depending on its current availability.

SUMMARY OF THE INVENTION

Borax 10 mol ($Na_2B_4O_7 \cdot 10H_2O$) or ground borate ore mixed with borax 10 mol can be effectively dehydrated to a product having approximately 60–68% $B_2O_3$ and up to about three to four percent insolubles in a 3-stage fluid bed dehydration. Compaction following dehydration is necessary to achieve acceptable product density.

The process of the present invention is particularly advantageous in light of the increasing scarcity of some fuels, as the process can be conducted using any one of a variety of liquid or solid fuels. Where natural gas is used, the natural gas required for dehydration is approximately half the amount required for the conventional borax fusion process.

Borax 10 mol, or a mixture of borax 10 mol and borate ore can be used in the process of the present invention. Using ore has the advantage that the borax content bypasses the entire refining process and thus reduces the raw material cost for the low hydrate process. Up to about 25%, preferably about 10%, borate ore may be used with the 10 mol borax.

The compaction system is integrated with the fluid-bed system in the process of the present invention in order to take advantage of the latent heat present in the fluid-bed discharge.

The first fluidized bed, using a mixture of heated air and combustion gases, is operated at a temperature of from about 140° to 200° F, and preferably from about 150° to 155° F. It is preferred to employ two substages in this first-stage bed, gradually raising the temperature as the material passes from one substage to the next. The actual temperature of the first-stage bed varies, of course, depending on the temperature of the fluidizing gas. As the temperature of the fluidizing gas is increased, the bed temperature will increase, although there is not a significant difference in the hydrate produced.

The temperature of the second stage ranges from about 250° to 300° F, preferably from about 260° to 280° F. In this stage, temperatures in excess of 400° F cause the bed to fuse. In the third stage, the temperatures may range from about 450° F to about 600° F, and preferably from about 500° to about 550° F. From this stage, the product may be sent to a compactor, or an optional fourth fluidized bed may be used to give even lower hydration of the product.

The feed to the compactor has a minimum temperature of 120° F and preferably ranges from about 200° to 600° F. The compactor rolls may have to be cooled to prevent fusion. The feed to the compactor includes a broad range of density and size, and includes up to 50% of dust recovered from the screening operation. A sheet-breaker and grinding mill may be used to break up the product to the desired size after compaction. The product is then screened and undersize particles are returned to the compactor.

The product is a 0.15 to 1.0 mol hydrate, having a bulk density of 50–60 lbs./ft³, preferably 50–55 lbs./ft³. If the feed contained borax ore, the product contains clay from the ore as impurities, generally an aluminum-silicate clay. The product, depending on the feed used, contains from about 35% to about 68% $B_2O_3$, and preferably from about 62% to about 65% $B_2O_3$. The insolubles present in the product may range up to 35%, although 3% to 5% insolubles is preferred. The high percent of insolubles and the low percent of $B_2O_3$ is obtained from using a high ratio of borax ore as feed to the process. The product is an off-white crystalline material containing a few dark specks of insolubles mixed in with the compacted material.

BRIEF DESCRIPTION OF THE DRAWING

The drawing illustrates the dehydration process of the present invention. Borate ore from the ore bin (10) and 10-mol borax from the 10-mol bin (11) are fed to the first stage fluidized bed where the temperature ranges from about 140°–200° F. The borate ore and borax overflow from this bed and are combined with the dust collected from the cyclone (13) and pass into the second stage bed (14) where the temperature ranges from about 250°–300° F. From the second stage chamber (14) the material overflows into the third stage fluidizing chamber where the temperature ranges from about 450° to 600° F. Dust from the second stage chamber (14) passes through another cyclone (16) and is also discharged into the third stage fluidizing chamber (15). From this chamber the material overflows to an elevator (18) for transfer to a compactor bin (19). Dust from this chamber is removed by another cyclone (17) and is also transferred by the elevator (18) to the compactor bin (19). A force feeder 20 transfers the material to a compactor 21 for compaction, after which the material is broken to the desired size by a sheet breaker 22. The product is screened on screens 23 and 24, and the desired dehydrated borax particles are sent out. Fines, dust, and oversized particles are recycled to the compactor and sheet breaker for conversion to the desired particle size.

The equipment to be used in the process of the present invention can be generally divided into three groups: the combustion system, the fluidized beds, and the compactor system. The combustion system generally comprises a blower and a refractory-lined combustion chamber with a burner capable of delivering hot combustion gases at 800° F and 44 ounces of pressure to the fluidized beds. The fluidized beds are in three stages. The second and third stages are fluidized independently with controlled hot fluidizing air. Exhaust gas from these stages combines to fluidize the first-stage bed after entrained dust is removed by a cyclone dust collector. From the first-stage fluidized bed, the fluidizing air passes through another cyclone to collect fines before venting to the atmosphere.

In operation, borax 10 mol (borax with 10 mols water of hydration) was fed into the first stage, was fluidized and partially dehydrated and overflowed to the second stage. Cyclone dust from this stage also overflowed to the second stage. The fluidized second stage overflowed to the third stage which in turn overflowed from the fluidized bed system. The dust collected from the second and third stages was discharged to the product elevator. The hot low hydrate borax was elevated to the compactor circuit where it first was compacted, then milled, and finally screened. Oversize particles from the screen were released as product and undersize particles were recycled to the compactor.

The degree of dehydration in the first stage is determined by the retention time, the degree of backmixing, and the amount of heat added to the first stage. The amount of heat that can be added to the first-stage bed is determined by the volume and temperature of the fluidizing gas. For maximum productivity, the fluidizing gas velocity is limited to about 90 scfm per sq. ft; otherwise, entrainment of material will overload the dust recovery cyclones. Maximum temperature of the inlet gas to the first stage is limited to about 400° F, as higher temperatures pop the borax excessively.

Suitable borate ores include the sodium borate ores such as kernite, tincal and tincalconite.

An impure low mol hydrate is produced from borate ore in the same equipment and in the same manner as from borax 10 mol. Insolubles are added by mixing up to about 10% ore, ground to minus 14 mesh, to the borax 10 mol. Thorough mixing is not necessary, as the three stages of fluidization effectively blend the ore and dehydrated borax. The final third-stage product of this mixture has a salt-and-pepper look which mostly disappears in the compaction equipment.

The theoretical thermal efficiency of the process of the present invention calculated on the basis of 60° F ambient air, 700° F average inlet fluidizing temperature, and 170° F exhaust temperature, is 82.8 percent. Assuming ten percent heat losses in the process, operating efficiency should be about 74.5 percent. Natural gas required (985 Btu/ft.$^3$ net) at this efficiency will be about 3.6 mcf/ton of dehydrated borax.

The compaction system is integrated with the fluid bed system to take advantage of the sensible heat present in the fluid bed discharge. The elevator and feed hopper are preferably insulated to retain heat in the fluid bed product prior to compaction.

The efficiency of the compactor depends upon the product size desired and the ability to deaerate the feed to the compactor. As produced, the fluid bed product consists of a mixture of fine dust from the third-stage cyclone and overflow product. This overflow product has a low density resulting from removal of water from the crystal lattice, leaving the crystal form nearly intact and making it relatively difficult to deaerate on the first pass through the compactor. The presence of air lowers compaction efficiency, as the compression force cannot be applied efficiently to the low mol hydrate. In some instances it is necessary to pre-compact the feed to the compactor in order to permit efficient deaeration by the compactor force feeder. The fine sizing required for this product tends to increase the compaction efficiency in that a large portion of the ground flake can be recovered as acceptable product. With the present system, about 50 percent of the compact can be recovered as product on each pass, the rest recycling to the compactor.

Compaction of the dehydrated borax was carried out with the compactor unit operating at speeds of 34, 30 and 26 rpm, with pressures ranging from 1100 psi to 2250 psi. The best flake was obtained at 26 rpm and at 1800 to 2000 psi pressure. A relatively soft flake was obtained when the compactor was operated at pressures below 1800 psi, a disadvantage because when a soft flake was produced, product recovery was lower and the recycle loads were excessively high.

The temperature of the feed to the compactor was usually in the range of about 140° to 215° F. At higher temperatures, i.e., up to 265° F, the flake produced did not show an improvement over the flake obtained at lower feed temperatures. The hardness index of the flakes, as measured with a Pacific Transducer Corporation Type D Durometer, was in the range of 54 to 60. In this scale, anhydrous borax has a hardness index of 95-100 and 10 mol borax has a hardness index of 50-55. Thus, the hardness of the compacted flake was slightly higher than that of 10 mol borax.

The following table shows the hardness values obtained as above for borax dehydrated according to the present invention:

TABLE I

| COMPACTOR OPERATING DATA | | | |
|---|---|---|---|
| Test Number | 1 | 2 | 3 |
| Feed Rate, pph | 1822 | 1794 | 2122 |
| Feed Temperature, ° F | 215 | 265 | 230 |
| Recycle, Mesh Size | +12 | +12 | +12 |
|  | −40 | −40 | −40 |
| Compactor Speed, rpm | 30 | 30 | 26 |
| +40 Mesh in Feed - % | 71.0 | 49.1 | 58.0 |
| +40 Mesh in Flake - % | 80.0 | 75.7 | 75.0 |
| −8 Mesh in Flake - % | 58.6 | 53.0 | 53.8 |
| Operating Pressure - psi | 1900 | 2000 | 1900 |
| Harness Value of Flake | 53 | 58 | 60 |

To reduce the compacted flake to the required product particle size, the compactor discharge was ground in a W. J. Fitzpatrick comminuting machine (hammer mill). After grinding, the product was separated by screening. The oversize and fines were recycled to the compactor and mixed with the fluid-bed discharge.

A sample of the dehydrated/compacted borax as produced according to the process of the present invention was found to be the 0.8 hydrate borax. The empirical formula of the amorphous product, based on one mol of sodium oxide is $Na_2O \cdot 2.04B_2O_3 \cdot 0.76H_2O$. The products of the process generally have 0.2 to 1.0 mol of water of hydration.

The sample was analyzed for $B_2O_3$ and $Na_2O$ by the well-known titrimetric method. The found results are: $Na_2O$, 28.48, 28.45, 28.39, average 28.44%; $B_2O_3$, 65.25, 65.21, 65.30, average 65.25%; $H_2O$ (by difference), 6.27, 6.34, 6.31, average 6.31%; $B_2O_3/Na_2O$ mol ratio = 2.04.

Samples of the product containing about 0.9 mol of water were tested for water pickup and solubility. To determine water pickup, weighed samples (50g. weighed to 0.000/g) were spread evenly over the bottoms of 90 × 50 mm. crystallizing dishes and placed in constant temperature — humidity chambers. Weight increase was determined by taking weights at measured time intervals. Temperatures and relative humidities fluctuated during the test because of malfunction of equipment, so the conditions given are estimated averages. After 6 days at 80° F, 72% relative humidity, the percent gain in weight was 18.3%. After 6 days at 93° F, 85% relative humidity, the percent gain in weight was 19.6%.

Solubility rate was determined by adding a weighed quantity of a solid to a stirred, weighed quantity of solvent maintained at temperature in a constant temperature bath. An aliquot was removed by pipette, through filter paper attached to the tip, after an appropriate time interval. The $B_2O_3$ in the aliquot was determined titrimetrically and the percent of the original solid dissolved was calculated from the ratio of the $B_2O_3$ found to the concentration of the final solution. It was found that 54% of the borax dehydrated according to the process of the present invention dissolved water in one minute at 70° F, giving a final concentration of 1.2% $B_2O_3$, and 30% of the borax dehydrated according to the process of the present invention dissolved in ethylene glycol in 25 minutes at 70° F, giving a final concentration of 9.6% $B_2O_3$.

Rates of solution were estimated visually by adding a weighed quantity of the borax dehydrated according to the present invention to a stirred, weighed quantity of solvent at room temperature. The percent dissolved was estimated visually at timed intervals, and the results tabulated below:

SOLUBILITY RATES AT ROOM TEMPERATURE BY VISUAL ESTIMATION

In water to give a final solution of 1.2% $B_2O_3$:

| % Dissolved | Time, min. |
| --- | --- |
| 50 | 2 |
| 75 | 5 |
| 100 | 8 |

In ethylene glycol to give a final solution of 9.6% $B_2O_3$:

| % Dissolved | Time, min. |
| --- | --- |
| 95 | 240 |

What is claimed is:

1. A process for dehydrating borax in a fluidized bed system comprising: introducing borax into a first-stage fluidized bed having a temperature of from about 140° to about 170° F.; transferring said borax from said first-stage fluidized bed to a second-stage fluidized bed, said second stage fluidized bed having a temperature of from about 250° to about 300° F.; transferring said borax without cooling from said second-stage fluidized bed to a third-stage fluidized bed, said third-stage fluidized bed having a temperature of from about 450° to about 600° F. to produce a hot dehydrated borax; transferring said hot borax to a compactor for compaction while said borax is at a temperature of at least 120° up to 600° F., grinding the resultant compacted product, and screening to produce a final dehydrated borax product having about 0.15 to 1 mole of water of hydration, a bulk density of 50 to 60 lbs./ft.$^3$, and about 35–68% $B_2O_3$.

2. The process of claim 9 wherein the borax is borax decathydrate.

3. The process of claim 9 wherein the borax is a mixture of borax decathydrate and up to 10% borate ore.

4. The process of claim 1 wherein said first-stage fluidized bed includes two sub-stages.

5. The process, according to claim 9, wherein the temperature in the first-stage fluidized bed is from 150° to 155° F, the temperature in the second-stage fluidized bed is from 260° to 280° F, and the temperature in the third-stage fluidized bed is from 500° to 550° F.

6. The process of claim 1 wherein said dehydrated borax product contains about 62 to 65% $B_2O_3$.

7. The process of claim 10 wherein said borax product contains about 3 to 5% aluminum-silicate clay.

8. The process of claim 1 wherein said hot borax transferred to said compactor is at a temperature of about 140° to 215° F.

* * * * *